Figure 1:
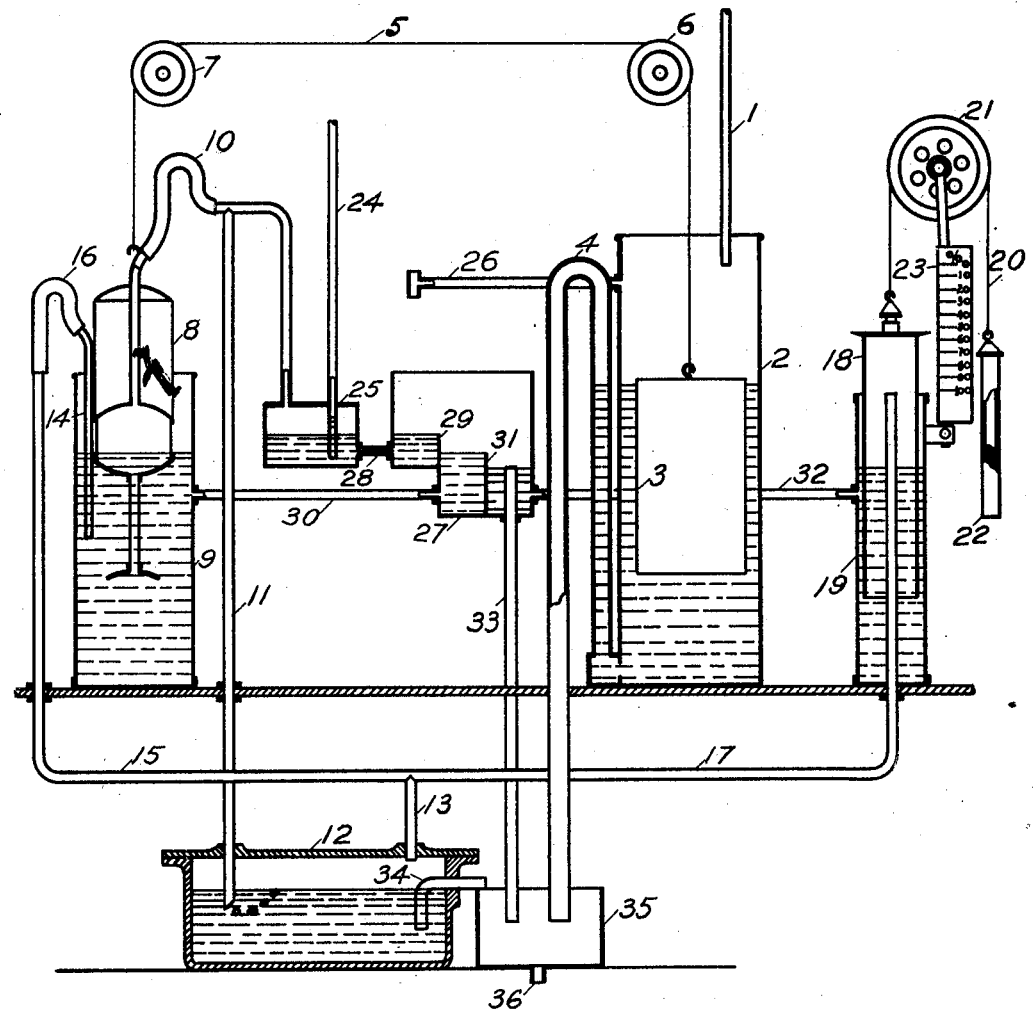

W. L. DE BAUFRE.
GAS ANALYSIS APPARATUS.
APPLICATION FILED OCT. 10, 1919.

1,384,603.

Patented July 12, 1921.

WITNESS:
Fred C. McClure
Richard H. Tilghman

INVENTOR,
Wm. L. De Baufre

UNITED STATES PATENT OFFICE.

WILLIAM L. DE BAUFRE, OF HIGHLAND PARK, MICHIGAN.

GAS-ANALYSIS APPARATUS.

1,384,603.                Specification of Letters Patent.    Patented July 12, 1921.

Application filed October 10, 1919. Serial No. 329,691.

*To all whom it may concern:*

Be it known that I, WILLIAM L. DE BAUFRE, a citizen of the United States, residing at Highland Park, in the county of Wayne, in the State of Michigan, have invented a certain new and useful Gas-Analysis Apparatus, of which the following is a specification.

My invention relates to instruments for indicating and recording the percentage of a given constituent in a gas mixture, and has for its object to withdraw automatically gas samples of equal volume and pressure from the source to be analyzed.

A further object of my invention is to automatically maintain at their proper levels, the several liquid seals required in the instrument.

With these and other objects in view, my invention consists of the novel construction, combination and arrangement of parts as hereinafter specifically described and illustrated in the drawings, wherein is shown the preferred embodiment of my invention, but it is understood that changes can be resorted to which come within the scope of the claims hereunto appended.

The figure is a front elevation, partly in section, of the herein described embodiment of my invention.

The gas analysis apparatus is operated by water or other liquid supplied continuously through pipe 1 to tank 2. As soon as the water overflows the bend of siphon 4, it discharges rapidly from tank 2 until the siphoning effect is broken by air entering the siphon within tank 2. Float 3 rises and falls with the water level.

Chain 5 running over pulleys 6 and 7 is attached to float 3 at one end and to extractor bell 8 at the other end, so that extractor bell 8 rises and falls in the liquid seal in tank 9 alternately with float 3 in vessel 2. As extractor bell 8 falls, the gas mixture previously drawn in during the up stroke is forced out through flexible tube 10 and pipe 11 into vessel 12, where it bubbles through the liquid absorbent reagent therein. The gas constituent to be measured is absorbed by this reagent. The remaining gas is discharged through pipe 13.

While extractor bell 8 is in its uppermost position, the gas in vessel 12 is at atmospheric pressure by reason of the lower end of tube 14 being above the surface of the liquid seal in tank 9. As extractor bell 8 descends, the gas remaining after bubbling through the reagent in vessel 12 is at first discharged to the atmosphere through pipes 13 and 15, flexible connection 16 and tube 14. When the lower end of tube 14 penetrates the surface of the liquid seal in tank 9, the residual gas then flows through pipe 17 to measuring bell 18, which rises in the liquid seal in tank 19 in proportion to the volume of the residual gas. The weight of the recorder bell 18 is counter-balanced by weight 22 attached to cord 20 passing over pulley 21. The percentage of residual gas or of the constituent removed by absorption in vessel 12 is indicated on scale 23 by the highest position reached by recorder bell 18. Any well known method of recording the highest position reached by bell 18 may be used to obtain a permanent record.

When extractor bell 8 ascends, the gas in the recorder bell 18 remains entrapped until the lower end of tube 14 passes out of the liquid seal in tank 9. During the upward motion, a fresh sample of gas mixture is drawn into extractor bell 8 through pipe 24, bubbling through liquid seal in valve 25, the lower end of tube 11 being sealed by the liquid reagent in vessel 12.

When the water in vessel 2 reaches the highest point, a small amount of it trickles through tube 26 and drops into the left hand compartment of vessel 27, which is connected by tube 28 to valve 25. The overflow edge of partition 29 determines the level of the liquid seal in valve 25, the excess water or other liquid draining into the middle compartment. The middle compartment of vessel 27 is connected by tube 30 to tank 9, the level of the liquid seal therein being determined by the upper edge of partition 31 over which the excess liquid runs into the right-hand compartment. Tube 32 joins the right-hand compartment of vessel 27 with tank 19, the level of the liquid seal in the latter being determined by the height of the upper edge of drain tube 33.

The absorption of a constituent of the gas mixture by the liquid reagent in vessel 12 augments the volume of the reagent. To eliminate the error consequent upon a change in volume of the gas space above the reagent, tube 34 is arranged to extend near the bottom of vessel 12 to be sealed by the liquid reagent therein, and project externally at about the height it is desired to maintain the surface of the liquid reagent. The excess reagent dropping from tube 34 is diluted by the water from tube 33 and siphon 4 in vessel 35 and discharged through pipe 36 to waste.

Having thus described my invention, what I claim and desire to secure by Letters Patent is:

1. In a gas analysis apparatus, a liquid seal, an extractor bell fitted to rise and fall in said liquid seal and connected with the source of the gas mixture to be analyzed, a second liquid seal, a measuring bell fitted to rise and fall in the second liquid seal and connected to the said extractor bell and to a venting device constituted by an open tube attached to the said extractor bell also dipping into a liquid seal, means for subjecting the gas mixture to the action of an absorbent reagent during its passage from the extractor bell to the measuring bell, and means of bringing the said liquid seals to their normal levels during each cycle of operations.

2. In a gas analysis apparatus, a liquid seal, an extractor bell fitted to rise and fall in said liquid seal and connected with the source of the gas mixture to be analyzed, a second liquid seal, a measuring bell fitted to rise and fall in the second liquid seal and connected to the said extractor bell and to a venting device constituted by an open tube attached to the said extractor bell also dipping into a liquid seal, means for subjecting the gas mixture to the action of an absorbent reagent during its passage from the extractor bell to the measuring bell, and means of bringing the said liquid seals to their normal levels during each cycle of operations comprising a plurality of chambers connected to said liquid seals, automatic means of supplying each chamber with a small quantity of liquid and automatic means of discharging the excess liquid.

3. In a gas analysis apparatus, a liquid seal, an extractor bell fitted to rise and fall in said liquid seal and connected with the source of the gas mixture to be analyzed, a second liquid seal, a measuring bell fitted to rise and fall in the second liquid seal and connected to the said extractor bell and to a venting device constituted by an open tube attached to the said extractor bell also dipping into a liquid seal, means of subjecting the gas mixture to the action of an absorbent reagent during its passage from the extractor bell to the measuring bell, and means of automatically discharging the excess reagent as its volume is increased by absorption of a portion of the gas mixture.

4. In a gas analysis apparatus, a liquid seal, an extractor bell fitted to rise and fall in said liquid seal and connected through a non-return valve having a second liquid seal to the source of the gas mixture to be analyzed, a third liquid seal, a measuring bell fitted to rise and fall in the third liquid seal and connected to the said extractor bell and to a venting device constituted by an open tube attached to the said extractor bell also dipping into a liquid seal, means of subjecting the gas mixture to the action of an absorbent reagent during its passage from the extractor bell to the measuring bell, and means of bringing the said liquid seals to their normal levels during each cycle of operations.

5. In a gas analysis apparatus, a liquid seal, an extractor bell fitted to rise and fall in said liquid seal and connected with the source of the gas mixture to be analyzed, a second liquid seal, a measuring bell fitted to rise and fall in the second liquid seal and connected to the said extractor bell and to a venting device constituted by an open tube attached to the said extractor bell also dipping into a liquid seal, means of causing the said extractor bell to rise and fall automatically comprising a vessel fed by a liquid, a siphon for emptying the vessel of the liquid at intervals and a float adapted to rise and fall with the liquid, means for subjecting the gas mixture to the action of an absorbent reagent during its passage from the extractor bell to the measuring bell, and means of bringing the said liquid seals to their normal levels during each cycle of operations.

WM. L. DE BAUFRE.

Witnesses:
FRED C. McCLURE,
ROBERT P. HOOPER.